(12) United States Patent
Madigan et al.

(10) Patent No.: US 7,234,722 B1
(45) Date of Patent: Jun. 26, 2007

(54) STANDING BABY STROLLER

(75) Inventors: Karen Jacy Madigan, Huntersville, NC (US); Lynn Furton McIntyre, Huntersville, NC (US); Daniel Lee Bizzell, Charlotte, NC (US); Ian Douglas Kovacevich, Charlotte, NC (US); Kevin James Dahlquist, Charlotte, NC (US)

(73) Assignee: Stroller Technologies, LLC, Charlotte, NC (US)

( * ) Notice: Subject to any disclaimer, the term of this patent is extended or adjusted under 35 U.S.C. 154(b) by 164 days.

(21) Appl. No.: 11/175,602

(22) Filed: Jul. 5, 2005

Related U.S. Application Data

(60) Provisional application No. 60/584,991, filed on Jul. 2, 2004.

(51) Int. Cl.
*B62B 7/00* (2006.01)

(52) U.S. Cl. .................. 280/642; 280/647; 280/47.38; 297/5

(58) Field of Classification Search ................ 280/642, 280/647, 47.38, 87.051; 297/5, 137
See application file for complete search history.

(56) References Cited

U.S. PATENT DOCUMENTS

| | | | |
|---|---|---|---|
| 1,793,848 A | 2/1931 | Gill et al. | |
| 2,415,146 A | 2/1947 | Nanna | |
| 2,451,956 A | 10/1948 | Kemper | |
| 2,606,593 A * | 8/1952 | Beurskens | 280/7.1 |
| 2,631,651 A | 3/1953 | Boysel | |
| 2,711,328 A | 6/1955 | Shone et al. | |
| 5,090,724 A | 2/1992 | Fiore | |
| 5,380,023 A | 1/1995 | McBee | |
| 5,622,375 A | 4/1997 | Fairclough | |
| 5,664,795 A | 9/1997 | Haung | |
| 5,839,748 A | 11/1998 | Cohen | |
| 6,203,054 B1 * | 3/2001 | Matsumoto | 280/647 |
| 6,231,056 B1 * | 5/2001 | Wu | 280/7.17 |
| 6,386,563 B1 * | 5/2002 | Chen et al. | 280/87.051 |
| 6,513,827 B1 * | 2/2003 | Barenbrug | 280/648 |
| 7,025,364 B1 * | 4/2006 | Clarke | 280/87.051 |

* cited by examiner

*Primary Examiner*—Christopher Bottorff
(74) *Attorney, Agent, or Firm*—Tillman Wright, PLLC; Chad D. Tillman; James D. Wright

(57) ABSTRACT

A stroller for transporting a child includes a wheeled frame including at least two base rails interconnected by a cylindrical hub, a spine, and a bracing linkage. A basket attaches to the spine, confining the child and supporting a seat ring. The seat ring includes upper and lower connected concentric arcs having different radii and supports a seat back on its lower arc. The seat back reclines, and the seat ring rotates from center. A seat base is supported on the frame and includes a platform movable between an extended position disposed inside the seat ring and a retracted position withdrawn from the seat ring. The stroller permits the child to be safely and comfortably transported in a standing, seated, or reclined position.

31 Claims, 7 Drawing Sheets

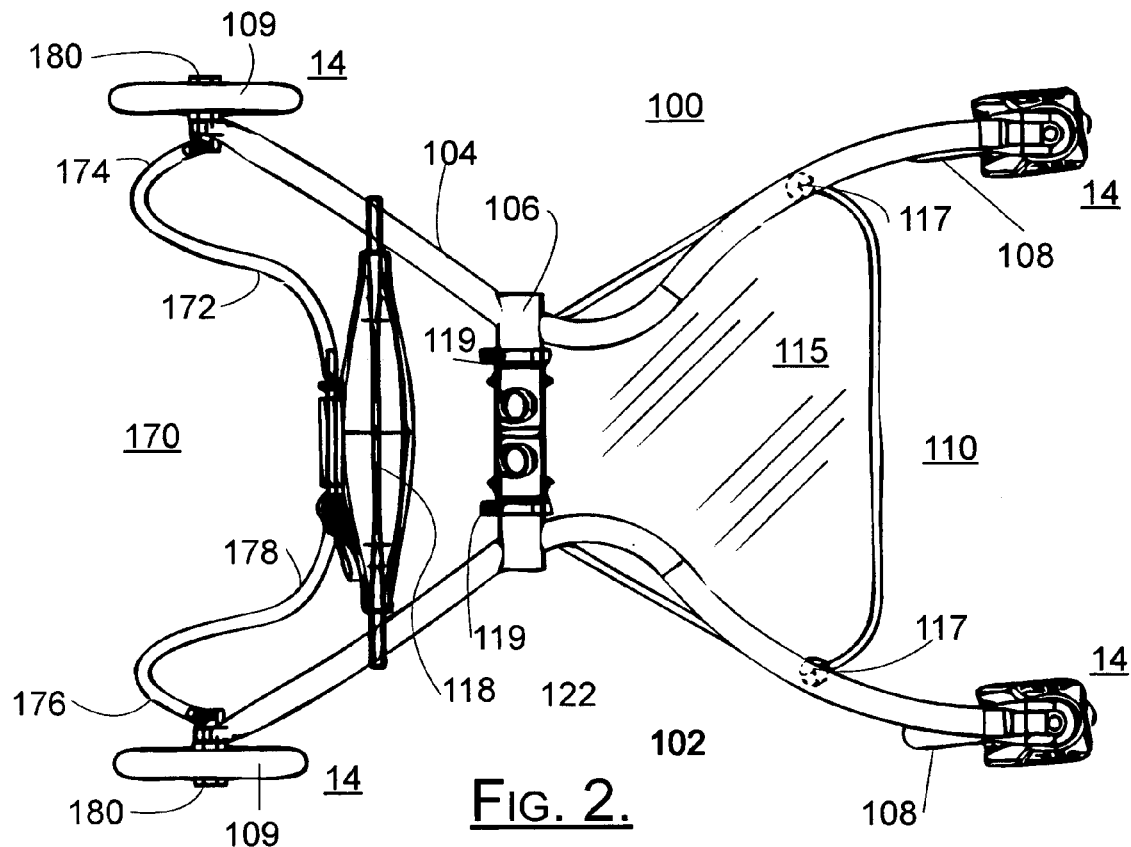
Fig. 2.
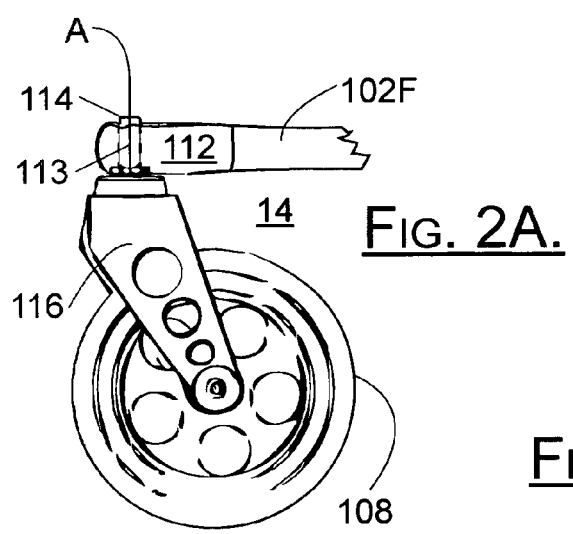
Fig. 2A.
Fig. 2B.

STANDING BABY STROLLER

CROSS-REFERENCE TO RELATED APPLICATIONS

This application claims the benefit of U.S. Provisional Patent Application Ser. No. 60/584,991, filed Jul. 2, 2004, the entirety of which is incorporated herein by reference.

FIELD OF THE INVENTION

The present invention relates to an improved baby stroller, and more particularly to a baby stroller in which the baby may transported selectively in a standing, sitting, or reclining position.

BACKGROUND OF THE INVENTION

An age-old problem for parents with small children is in transporting them without having to carry them. Historically, the perambulator or baby carriage was used; devices of this type resembled a crib with wheels, a handle, and a cover, and the baby was laid in the carriage for transport. More recently, parents typically employ a stroller for this purpose. Strollers of a wide variety of styles have been developed, but the basic stroller generally includes a cloth seat, suspended within a wheeled frame, and a restraint of some type to keep the child in the seated position. Other solutions include front carriers, sling carriers, and backpack carriers, all of which have their own drawbacks, primarily because the parent must bear the burden of the child's weight. As the child grows older, comfort for the parent becomes an issue.

While the stroller is indispensable to modern parents, there are drawbacks to its use as well. Babies spend a great deal of time confined in a sitting position—in a high chair at the dinner table, and in a car seat while traveling—and the time spent restrained in a stroller adds to that seated time. Most young children can only tolerate the restrained seated position for a short time before becoming antsy, irritable, and bored. For older babies and toddlers, who have begun to pull up or stand, the tolerance for a restrained seated position may be quite short, because of their inherent desire to stand.

Additionally, recently published reports correlate the confining of babies to seated positions with the later sedentary preferences linked to childhood obesity, as well as to delayed development. As noted by the National Association for Sport and Physical Education, "Confining babies and young children to stroller, playpens, and car and infant seats for hours at a time may delay development such as rolling over, crawling, walking, and even cognitive development." Consequently, there is a need to encourage physical activity and to discourage restraint to a seated position, where it is feasible to do so.

The use of high chairs is certainly reasonable and valid for a child who is eating, and the proper restraint of a child into a car seat is legally required when the child is traveling by car. However, there is a distinct need for an improved stroller that permits the child to be safely restrained and strolled, while being kept in a supported, upright position, and in a safe, entertaining environment, so that the baby is afforded the opportunity to use developing muscles. Such a stroller would be an alternative to constant seated restraint, but would also ideally retain the familiar and convenient features of a conventional stroller. These features typically include the ability quickly and easily to fold the stroller into a compact configuration for storage and transport, the availability of adjustable, comfortable handles for parents of different heights, the availability of storage space for a diaper bag or the like, fully pivotable wheels, a canopy for shielding the baby from the elements, and a structurally sturdy design.

SUMMARY OF THE INVENTION

In accordance with the aforementioned goals and needs, the present invention is an improved stroller for transporting a child selectively in a standing, seated, or reclined position.

Specifically, the present invention includes a stroller that has a frame that includes in principle at least three elements for sturdy construction: base rails interconnected by a cylindrical hub; a spine connected to the cylindrical hub by a concentric cylindrical sleeve that surrounds the hub, and from which the spine extends generally upward; and a bracing linkage, which is rotatably attached to the base rails and can be placed against the spine in order to support the spine.

A plurality of wheels, typically at least four, are attached to the frame. These wheels are preferably attached at each end of each of the base rails and may pivot about a vertical axis in addition to rolling in the usual manner.

A basket for supporting the child is attachable to and supported on at least the spine and in some embodiments attachable and supported on the bracing linkage. The basket includes a ring for confining the child and a sling for supporting the child in the standing position. Additionally a seat is attached to the spine below the basket. The seat includes a seat base member that is retractable for clearance when the child is in the standing position and may be extended to provide support for the child in the seated and reclined positions.

The frame is movable between unfolded and folded positions by rotation of the sleeve about the hub.

In another feature of the present invention, a handle is attached to the spine. Generally, the spine will included a sleeve member and a handle member, with the handle member being slidable along and generally interior of the sleeve member in order to lengthen or shorten the spine. This feature permits the handle height to be adjusted to a higher or lower position within a reasonable range to permit parents of different heights to place the handle at a comfortable position. Preferably the handle may be placed at one of a series of positions corresponding to varied handle heights. Because the spine will generally form an arc, the sleeve member and the handle member will be curved along the same arc. This specific arrangement and other arrangements belong generally to a class of telescoping spine configurations.

In yet another feature of the present invention, the seat also includes a back member for providing back support to the child in both the seated and reclining positions. Depending upon the specific configuration of these positions, the seat back may recline and return to upright as desired. Regardless, however, the seated position is defined by positioning the seat base member proximate the back member and/or the spine, and the reclined position is defined by articulating the seat base member away from the back member and/or the spine.

The present invention also includes a standing support member that is attached to the frame, usually in the region of the hub, and that extends generally parallel to and between the base rails. The purpose of this standing support member is to support the feet of the child when the child is in the standing position. While this member may be a rigid surface, it is preferably to some degree a soft, springy (or otherwise resilient) support surface, such as a trampoline, soft goods, or an air pillow, for example.

In still another feature of the present invention, the spine and the bracing linkage define between themselves a storage area. Because of the generally triangular configuration of the frame, the storage area is ample for storing an article such as a diaper, a travel bag, or a purse in a manner in which the article is supported on the frame. A hook or other hanging structure may be provided for this purpose.

Another feature of the ring and the sling, or more generally of the seating support for the child, is that the child is able to rotate through a significant arc of rotation at least while in the standing position. For example, at least a portion of the right and the sling may be co-rotatable from center in order to provide the child with the ability to turn to the left and right. This feature permits a greater range of motion for the child.

The basket or some portion of it may include a port into which the bracing linkage may be inserted, against the spine, in order to complete the support structure when the stroller is in the "in use" position. This port retains the bracing linkage in a manner that ensures the structural integrity of the stroller when it is in use, and an interference fit, a press fit, a positive lock, or another suitable retention mechanism may be used.

In another feature of the present invention, a canopy is provided in order to shade the child from elements such as sun, wind, or precipitation exposure. This canopy may include a series of individually adjustable canopy struts for full or partial coverage.

In another feature of the present invention, one or more of the wheels may be lockable against rotation.

BRIEF DESCRIPTION OF THE DRAWINGS

Further features, embodiments, and advantages of the present invention will become apparent from the following detailed description with reference to the drawings, wherein:

FIG. 2 is a plan view of a base of a stroller as in FIG. 1;

FIGS. 2A and 2B are detail views of wheels of a stroller as in FIG. 2;

DETAILED DESCRIPTION OF THE PREFERRED EMBODIMENTS

Figure 1:
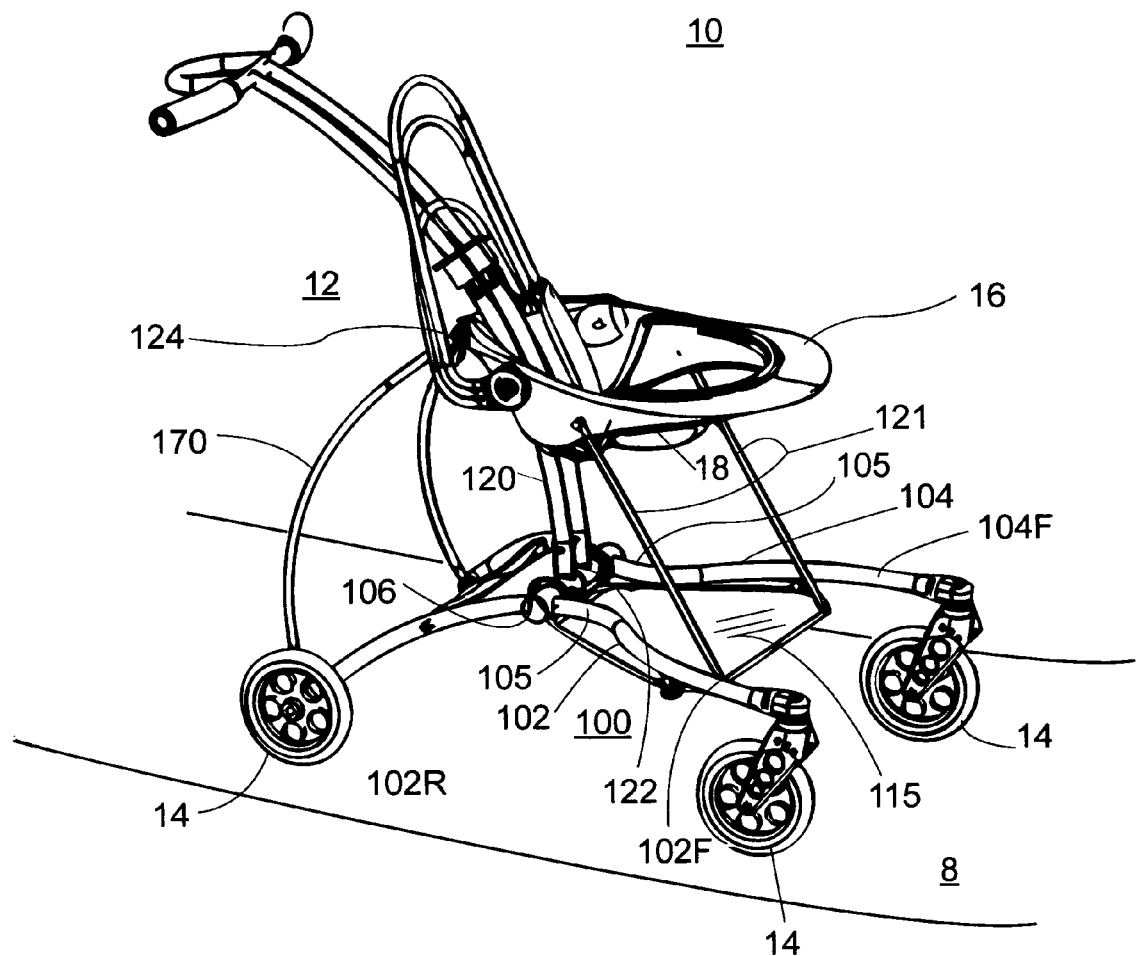
FIG. 1 is a general perspective view of a stroller according to the present invention.

Referring now to the drawings, a stroller 10 according to the present invention, transportable along a path 8, is shown in FIG. 1 in a general perspective view. The stroller generally includes a frame 12; four wheel sets 14 attached to and supporting the frame 12 to permit the stroller to be rolled along to transport a child therein; a basket 16 for supporting the child; and a seat 18. Each of these components will be discussed in greater detail below, in connection with FIG. 1 and subsequent figures.

In a preferred embodiment of the invention, the frame 12 includes at least two base rails 102,104, which are interconnected by a cylindrical hub 106. This hub 106 extends laterally interbetween the base rails 102,104 and joins with each of the base rails 102,104 each at a point 105 approximately midway along the base rails 102,104, between rear ends 102R,104R and forward ends 102F,104F, to form a generally H-shaped base 100. The frame 12 also includes a spine 120, which includes a cylindrical sleeve 122 that is disposed concentrically about the hub 106, such that the sleeve 122 may slide along the radius of the hub 106 while remaining supported on the hub 106. The frame 12 further includes a bracing linkage 170 that is rotatably attached to the base rails 102,104 in the region of the rear ends 102R, 104R, and which may be disposed against the spine 120 at a support location 124 in supporting relation to the spine 120. The bracing linkage 170 and its operation will be described in greater detail below. In this manner, a triangular support frame 12 is established.

Referring now to FIG. 2, a plan view of the base 100 shows the two base rails 102,104, joined by the cylindrical hub 106 as described above. The base rails 102,104 are formed of a metal, plastic, or composite tubing which is selected and configured to provide sufficient strength to bear the weight of the remaining component parts of the stroller 10, plus the weight of any child carried therein and any other materials carried thereon. The base 100 is itself supported on several (preferably four) sets 14 of wheels 108,109 attached to the base 100, or more specifically to the forward and rear ends 102F,104F,102R,104R of the base rails 102,104.

As will be seen by a person having ordinary skill in the art, these wheel sets 14 may take a number of different forms without departing from the scope of the invention, and not merely the form illustrated in the figures. For example, as is shown in FIG. 2, in a preferred embodiment the front wheel set 14 is mounted to the base rail end 102F in a manner that permits the free revolution of the front wheel 108 about a vertical axis A (see FIG. 2A). Specifically, the base rail end 102F is provided with a caster end 112, which houses an axis pin 114. The axis pin 114 freely rotates within an aperture 113 in the caster end 112 and is attached to a wheel fork 116, onto which the wheel 108 is mounted. This configuration allows the stroller 10 to be turned rather easily, with a minimal turning radius, because the wheel 108 freely rotates with two degrees of freedom, being mounted upon an axis which is horizontal and parallel to the path 8 (see FIG. 1), while also revolving about axis A. Alternatively, as is illustrated in the preferred embodiment shown in FIG. 2B, the rear wheel 109 is mounted with axis directly on the rail 102R, in a configuration that does not permit the free revolution of the rear wheels 109 about a vertical axis and therefore promotes lineal transport stability along the path 8 (see FIG. 1). Those skilled in the art will recognize that for optimal stability and maneuverability, front wheels of the type illustrated in FIG. 2A and rear wheels of the type illustrated in FIG. 2B are preferred to be selected. However, this is merely one of many different configurations that are possible without departing from the scope of the invention.

In a preferred embodiment of the invention, the base rails 102,104 are configured with an inward central bend, and the hub 106 has a width profile that is significantly narrower than the overall width of the stroller 10. The base rails 102,104 are preferably curvilinear in appearance and configured in a way that simultaneously promotes quad-point stability, structural support of the central spine 120, and a folding action (to be described in greater detail below). Specifically, the symmetrical inward central and upward bend of the base rails 102,104 provides for a four-way quasi-footed arrangement of the wheels, a central footing for the spine 120, and a region 110 between the base rails 102,104 that is of sufficient size to accommodate motion of the basket 16 therethrough during folding for storage.

Referring again to FIG. 2, it should be noted that different configurations of the connection between the base rails 102 or 104 are possible. In FIG. 2, the base rails 102,104 are formed as two pieces which are attached, by welding or any other suitable attachment mechanism, to the hub 106. Alternatively, the base rails 102,104 could be formed as a single piece, to each of which the hub 106 is attached on its ends by welding or any other suitable attachment mechanism. Depending on various configurations of the base rails 102, 104 and the hub 106, and depending on other manufacturing and durability considerations, either of these connections, or any similar connection, may prove suitable for an embodiment of the invention, without departing from the scope thereof.

Additional features of the base also illustrated include an optional footrest stretcher 118, which extends between the base rails 102,104 posterior of the hub 106. This stretcher 118, though optional, can be useful in certain embodiments to assist in maneuvering the stroller, such as to lift the stroller onto a curb.

Also visible in FIG. 2 is the cylindrical sleeve 122, the purpose and construction of which will be described more fully below. The sleeve 122 surrounds the hub 106, and in the embodiment shown, is formed for manufacturing reasons (because of the permanent connection between the base rails 102,104 and the hub 106) as upper and lower half-cylinders, which mate to form the cylindrical sleeve 122. The two half-cylinders are held in place, potentially both in mated relationship and with side-to-side confinement, by a pair of collars 119.

Figure 7:
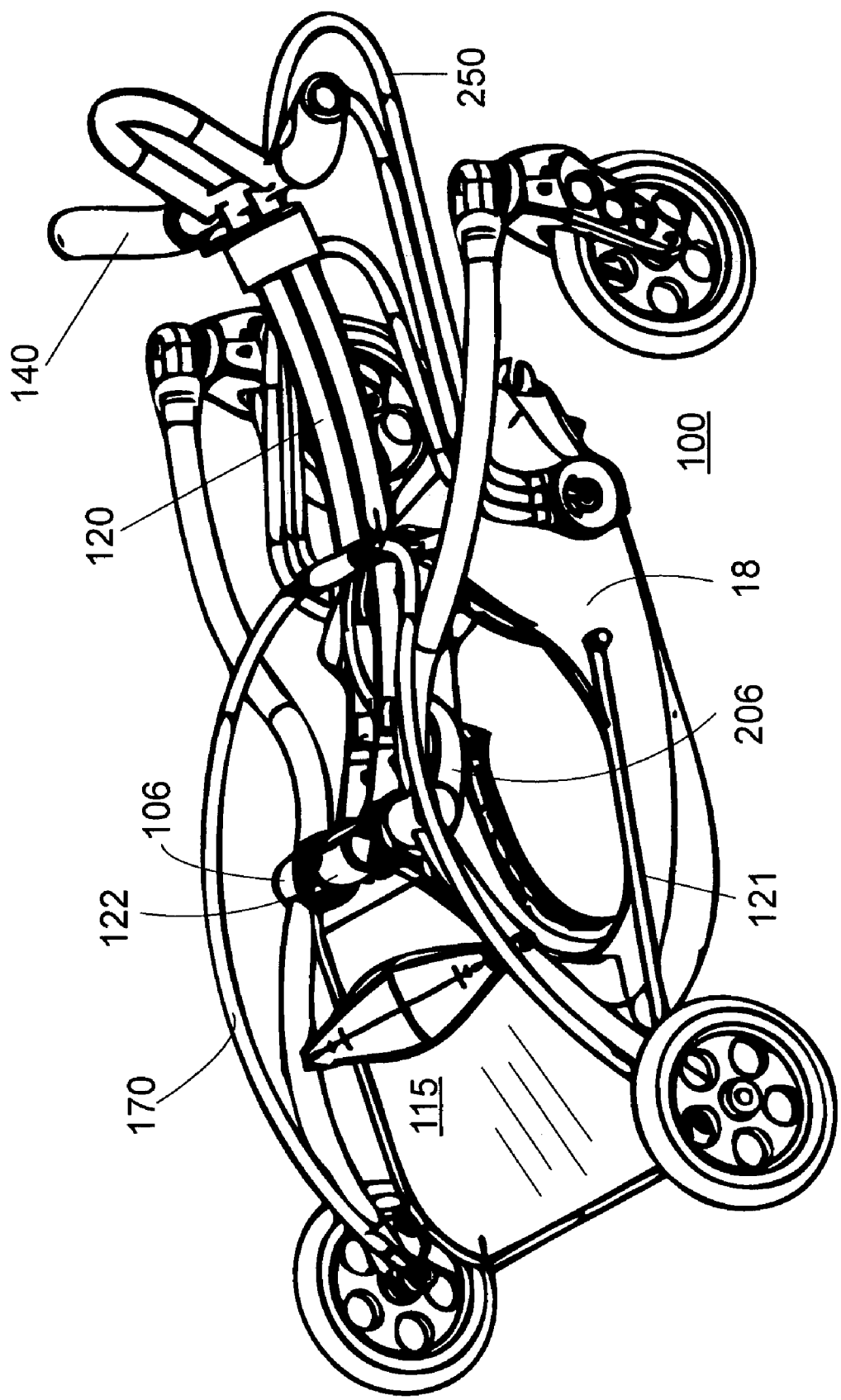
FIG. 7 is a perspective view of a stroller as in FIG. 1, but in the folded position.

A support surface 115, which may be a resilient support surface such as a trampoline, is preferably rotatably mounted upon the cylindrical sleeve 122 at attachment points 139 (see FIG. 3), and releasably attachable to the base rails 102,104 with a pair of posts 117 (shown in FIG. 2 in phantom). These posts 117 may be formed with an upper surface curved concavely to mate with the base rails 102,104, and may feature a connection of sufficient precision and resiliency to hold the trampoline 115 in place during operation of the stroller in the standing position, yet be easily dislodged during folding. A magnetic connection may be preferred for this purpose. The support surface 115 is provided as a location for the child to stand and (if a trampoline is provided) to bounce lightly. The trampoline 115 may also be attached to the basket 18 by trampoline linkages 121, as shown in FIGS. 1 and 7. These linkages 119 may be rigid metal or plastic, or they may be cables.

Figure 3:
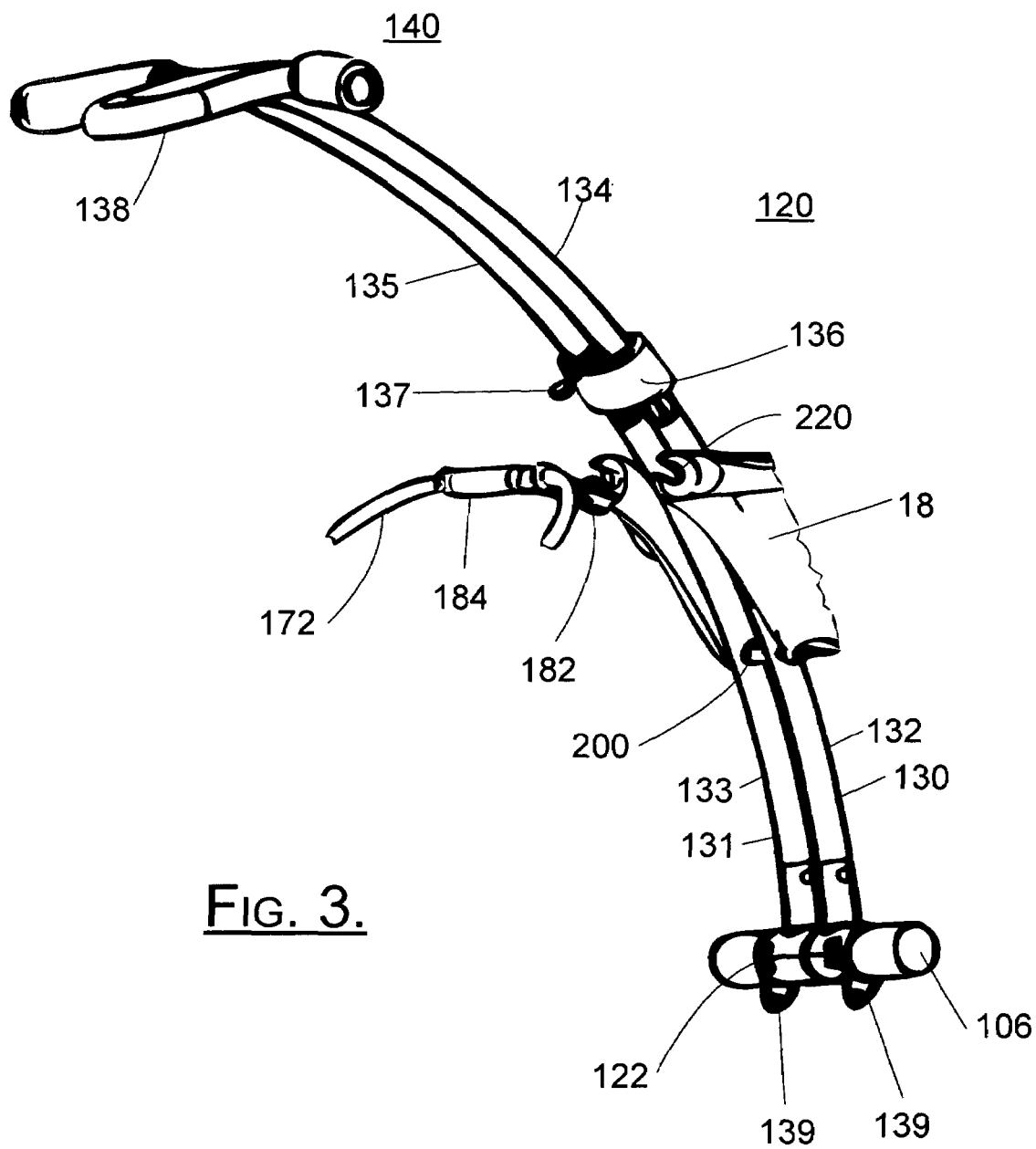
FIG. 3 is a side perspective view of a spine of a stroller.

Referring now to FIG. 3, a spine 120 of the stroller 10 is shown in greater detail in a side perspective view. In a preferred embodiment, the spine 120 comprises a pair of spine tube members 130,131, preferably made of the same material selected for the base rails 102,104, which are fixedly attached to and extend upward from a generally cylindrical sleeve 122 that is sized to surround the hub 106 of the base 100, in sliding relation along the curved surface of the hub 106. Trampoline attachment points 139 are disposed on the underside of the sleeve 122. In a preferred embodiment, the spine 120 forms the support structure for the basket area 16 and the seat 18 (see FIG. 1) in which the child is to ride. The spine 120 is preferably formed in a slight arc that in the unfolded, operational position extends generally vertically from the sleeve 122 and back toward the operator (not shown), ending in a handle mechanism 140 which is disposed at a height of comfortable hand operation.

In a preferred embodiment, the spine tube members 130,131 include spine outer tubes 132,133 extending from the sleeve 122 to a point at or above the seat mounting location 200, and spine inner tubes 134,135 of slightly smaller diameter, which are sidably disposed within the outer tubes 132,133 to increase or decrease the length of the spine 120, which therefore disposes the handle mechanism 140 at a variable location to accommodate operators of varying hand heights. In this embodiment, the spine outer tubes 132,133 are referred to as sleeve members, and the inner tubes 134,135 are referred to as handle members. The sleeve members 132,133 and the handle members 134,135 are for operational reasons bent on the same arc, which permits a telescoping action.

The particular handle height desired is set by a locking cuff 136, disposed at the juncture of the sleeve members 132,133 and the handle members 134,135, which may be released to permit the handle members 134,135 to be slid within the sleeve members 132,133 to the desired handle height, and engaged to retain the handle members 134,135 in the desired location. Ideally, the locking cuff 136 has a handle release mechanism 137 and additionally serves, in a two-tube or multi-tube system, as a spacer to assist in retaining the spine members 130,131 substantially mutually parallel throughout their respective lengths. Additionally, the top ends of the spine members 130,131 may be permanently affixed to the handle mechanism 140 to keep them parallel near the top ends. Alternatively, the handle members 134,135 could be bent severely to form handles and kept appropriately spaced by one or more spacer members.

In a preferred embodiment, the handle mechanism may be provided with auxiliary mechanisms, such as a handle arc 138 for hanging articles, a cup or bottle holder, or similar members designed to be within easy reach of the stroller operator. These features may contribute significantly to the usability of the invention, but their presence or absence does not create a departure from the scope of the present invention.

Referring again to FIGS. 1, 2, and 3, it has been noted that the frame 12 generally features three components that relate to the stability of the stroller: the base 100, the spine 120, and the bracing linkage 170, which together cooperate to form a generally triangular frame structure 12. The benefits of this simplified frame structure 12 will become apparent in connection with the discussion of the seat 18 and basket 16 below. The base 100 and frame 120 have been previously discussed. The bracing linkage 170 is comparatively simple in operation.

In a preferred embodiment as shown in FIG. 2, the bracing linkage 170 includes a curvilinear tube 172 having left and right ends 174,176 and formed into a U or scoop shape with a third-dimensional outward bend 178 in the central region. The left and right ends 172,174 are each pivotally attached to the axes 180 of the left and right rear wheels 109, or thereabouts on the rear ends 102R,104R of the base rails, so that the bracing linkage tube 172 may be pivoted into or out of contact with the spine 120.

Although the spine 120 may itself be provided with a receiving port for receiving the attachment section 184 of the bracing linkage tube 172, in the preferred embodiment shown in FIG. 3, the port 220 may be formed integrally with the basket 18 such that the linkage tube 172 is received in supporting abutment to the spine 120. The bracing linkage tube 172 will ideally be provided with a positive locking mechanism 182, for preventing spontaneous disengagement of the linkage tube 172 from the port 220, for as will be seen in connection with the discussion of the operation of a device according to the invention, disengagement of the linkage tube 172 from the port 220 begins the process of folding the stroller for storage. Alternatively, the port 220 may be configured to provide a resilient interference-type fit or press fit with the linkage tube 172, such that some significant force is required to dislodge the tube 172 from the port 220. For example, a spring-loaded mechanism disposed on the linkage tube 172 between the members of the port 220 may be compressed by the locking mechanism 182 to facilitate quick release or insertion into the port 220, then released to exert a spring force that retains the tube 172 within the port 220. In this embodiment, the locking mechanism 182 comprises a lever that engages to compress the spring-loaded mechanism for release or insertion, and is configured with an arc profile to match the tube 172, thus allowing the locking mechanism 182 to clip onto the tube 172 for securement once inserted.

Regardless of the particular details of reception, however, the triangular arrangement provides support for the basket 18 (as will be described below) while maximizing the free space in the region of and below the basket 18.

Figure 4:
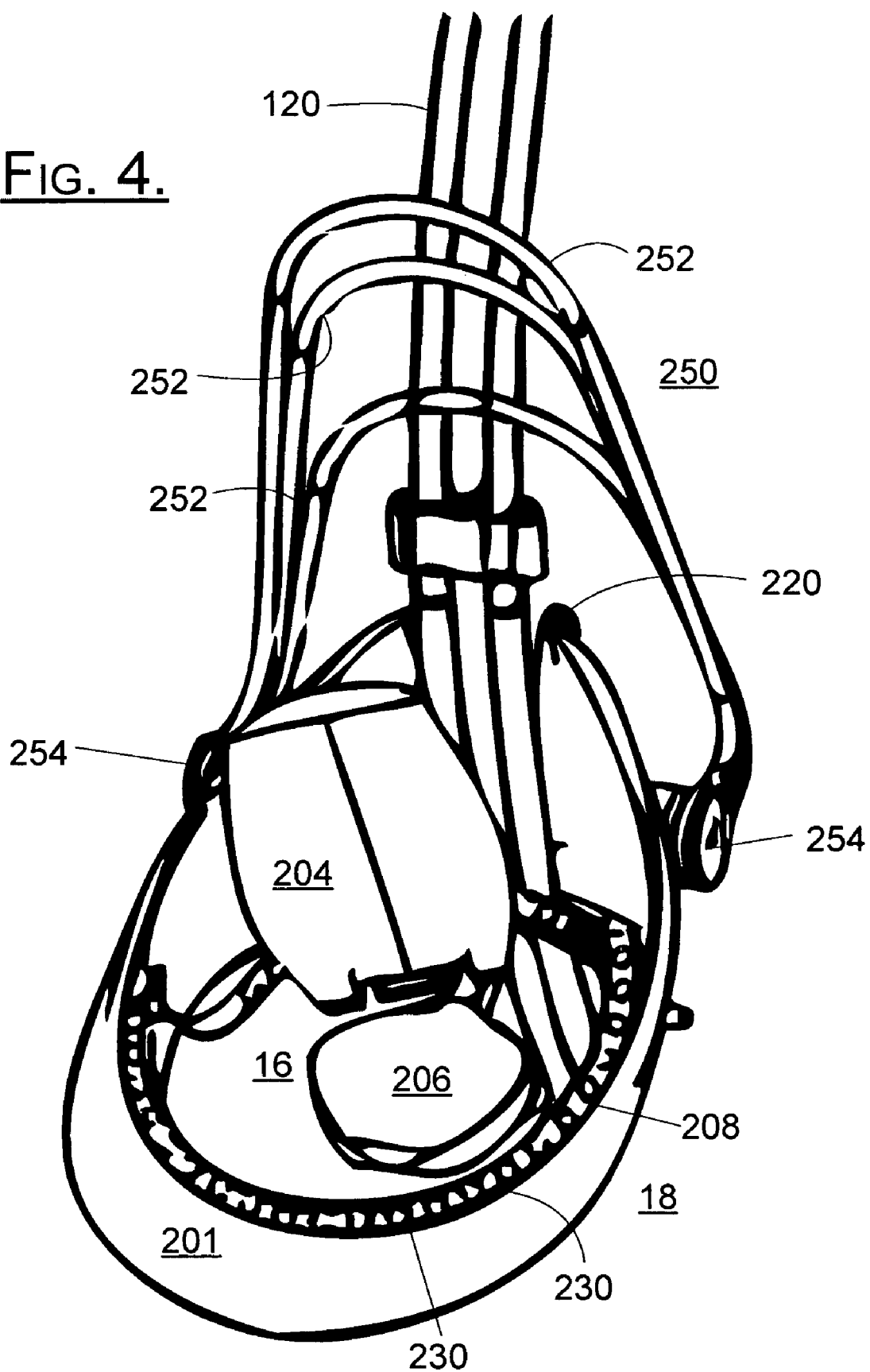
FIG. 4 is a detail perspective view of a seat and basket of a stroller.

Referring now to FIG. 4, a basket 18 and seat 16 mechanism is shown in a detail view. A seat 16 according to the present invention presents the user with three possible positions: a standing position, a seated position, and a reclined position, each of which is defined according to a position and configuration of the seat 16.

The basket 18 is generally round or ovoid when viewed from above, with a generally void center section, and thus forms a confinement ring 201, a portion of which extends around the spine 120 and in a preferred embodiment provides a port 220 for receiving the bracing linkage tube 172 (see FIG. 3). The child may be placed into the remainder of the confinement ring 201 for transport. Viewed from the side, as can be most easily seen in FIG. 1 or 5A, the basket 18 is saucer-shaped, with a fairly substantial undersection 202 that extends downward from the saucer portion 203 near the spine 120. On this undersection 202 the basket 18 is pivotally mounted upon the spine 120 at a seat mounting location 200 (see FIG. 3), such that during folding the basket may be rotated down so that its forward portion is in contact with or near to the lower portion of the spine 120.

The seat 16 is in a preferred embodiment provided with three principal members: A seat back 204, a seat base 206, and a two-level seat ring 208.

Figure 5:
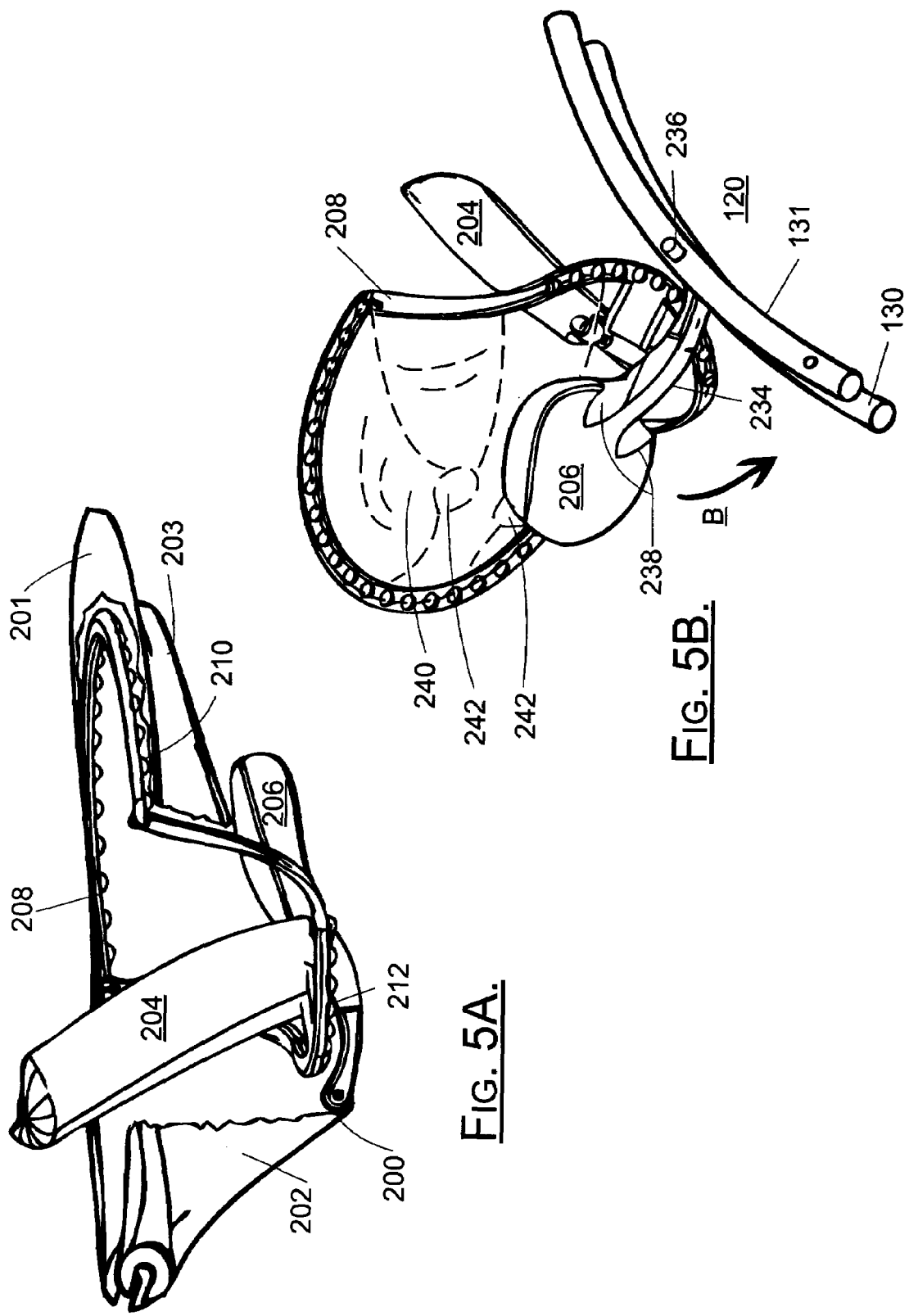
FIG. 5A is a side perspective view of interior components of a seat of a stroller.
FIG. 5B is a perspective view of the underside of a seat as in FIG. 5A.

Referring now also to FIG. 5A, the basket 18 is optimally molded so as to provide a pair of tracks 210,212 for supporting and guiding a rotating motion of the seat ring 208. The upper track 210 is disposed along the inner rim of the confinement ring 201, in approximately the front half of the saucer section 203 of the basket 18, and is co-radial with the upper level of the two-level seat ring 208. The lower track 212 is disposed along the inner radius of the undersection 202, but forward of the spine 120, and is co-radial with the lower level of the seat ring 208. The tracks 210,212 provide support for mounting the seat ring 208 in rotative sliding relation therealong.

The seat ring 208 is provided with a number of friction-reducing members 230, which may be wheels, ball bearings, rounded knobs, or a material of a low coefficient of sliding friction, or any other suitable material or construction that permits the seat ring 208 to rotate upon the basket 18. As a specific alternative equivalent, the friction-reducing members 230 may be set into the basket 18, and the seat ring 208 may be provided on its underside with a concave arc profile configured to mate and cooperate with the friction-reducing members 230, all without departing from the scope of the invention. In a preferred embodiment, the seat ring 208 has two levels, one upper and one lower, which are concentric arcs having different radii. This configuration allows the seat ring 208 to form a mounting location for the seat back 204 that permits the seat back to rotate through a significant range (as much as 100° from center in either direction). This permits the child to be positioned, or to self-position, in a location other than a straight-forward view.

Referring now to FIGS. 5A and 5B, it can be seen that the seat back 204 is pivotally mounted upon the lower radius of the seat ring 208, or more specifically on a short extension therefrom, so that the seat back 204 may be positioned in a straight-up "chair" position or in a reclined position. Depending upon the particular arrangement of the seat ring 208 and the basket 18, the reclining action may only be available in the center-forward position, at which the seat back 204 is directed to face the front of the stroller directly.

The seat base 206 includes a platform 232 that is disposable generally in the center of the seat ring 208, and that is rotatably attached by a strut 234 to the spine 120, independently of the remainder of the seat 16. The strut 234 is mounted upon an axis 236 (perhaps coaxial with the lower point of attachment of the basket 18 to the spine 120) that by a ridge-and-detent system, a positive lock, an interference fit, or some other appropriate system may be locked into a firm "up" position that corresponds to a "sitting" or "reclining" position of operation. Upon release of this locking mechanism, however, the seat base 206 may be rotated in the direction of arrow B into a "down" position against the spine 120, such that full clearance is provided to allow the child to stand in the "standing" position. In order to maximize the clearance, the platform 232 may be provided on its underside with a pair of recesses 238 that correspond to and cooperate with the spine tube members 130,131. An optional handle (not shown) may be provided to facilitate the upward or downward motion.

In an alternative embodiment of the present invention, the platform 232 may be configured to be rotatable along with the seat ring 208, in a barstool-like configuration.

As can be seen in FIG. 5B, an optional but preferred seat sling 240 (shown in phantom indicated by dashed lines) is provided. The sling 240 is co-rotational with the seat ring 208, and provides support for the child in all positions, but most necessarily in the standing position. The sling is provided with leg holes 242, and is preferably formed of breathable Neoprene or a similar material.

Additionally, the seat back 204 and seat base 206 may be provided with soft goods (not shown), which provide for extra comfort for the child in the seated and reclining positions.

Referring again to FIG. 4, another optional feature found in the preferred embodiments of the present invention is an extendable canopy 250. The canopy 250 provides optional shade for the child and includes a set of canopy struts 252 that support a fabric canopy cover, which is stretched across the struts 252 but not shown in the figures. The canopy struts 252 are U-shaped and attached to stackable discs 254, which are rotatably mounted to either side of the basket 18. The stackable discs 254 are configured with stops that prevent the extension of the associated struts 252 beyond a point predetermined for that strut 252. In the retracted position, the struts 252 are "stacked," to minimize the extension of the canopy cover, and the struts 252 telescope outward over the basket 18 to maximize the extension of the canopy cover. The presence of three struts 252 as shown in FIG. 4 permits four degrees of canopy extension: no extension (full retraction), one strut's extension, two struts' extension, and three struts' extension (full extension).

Figure 6:
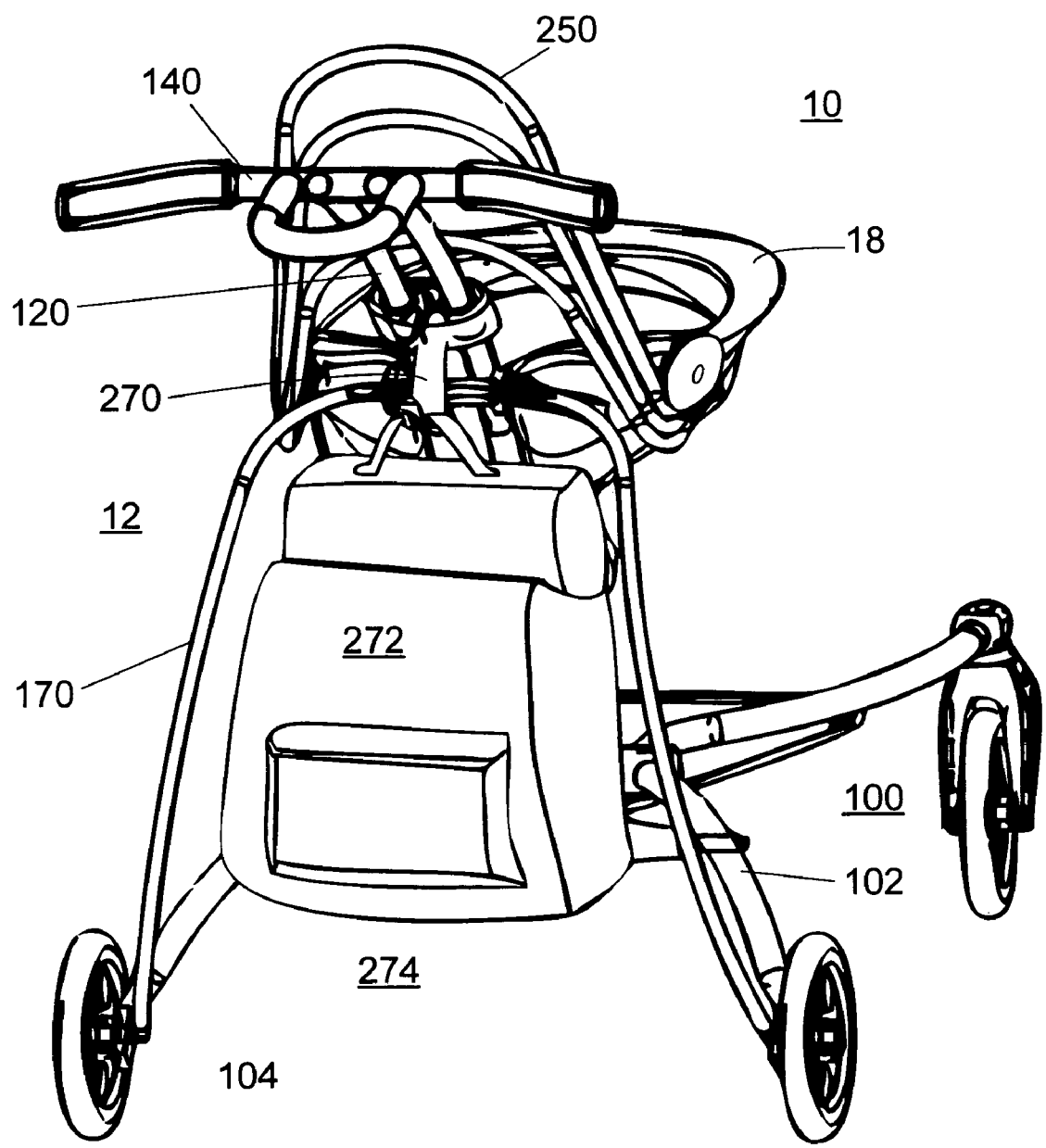
FIG. 6 is a rear perspective view of a stroller as in FIG. 1.

Referring now to FIG. 6, a stroller according to the present invention is shown in a rear perspective view, with reference numerals corresponding generally to those used in figures already described. The rear view shows an optional hook 270, which in the figure extends from the locking mechanism 136, but which could be placed at a different point on the spine 120 as desired. The hook 270 permits a diaper bag 272, or a purse or backpack or other similar article, to be hung within a storage area 274 that is generally defined and bounded by the rear portions of the base rails 102,104 and the U of the bracing linkage 170. The hook 270 could include any suitable mechanism for hanging such an article and may take a form specialized to a particular kind of article; thus, the term "hook" may include any support surface suitable for hanging or supporting such an article.

Those skilled in the art to which the present invention relates will recognize the need to restrain the child within the confinement ring, in at least the sitting and reclining positions. In addition to the sling described above, the use of a safety belt, a harness, shoulder straps, or another similar conventional mechanism to restrain the child is recommended. The design of embodiments of the present invention is suited to the use of virtually any of these devices without restraining the operation of the stroller in any fashion.

Another element essential to the utility of the present invention is in its capacity to be folded into a more compact unit for storage or transport in a car. As can be seen in FIG. 7, a stroller 10 according to the present invention is foldable into a folded position first by placing the seat base 206 in the "standing" position and lowering the handles to their minimum extension. Next, releasing the bracing linkage 170 from its port 220 permits the basket 18 to be rotated downward so that its forward end is proximate the spine 120. By the nature of the trampoline linkages 121, the trampoline 115 will also be rotated "under" (the stroller may need to be lifted for this purpose). The spine 120 may then be rotated forward, with the sleeve 122 slidably rotating about the hub 106, into a "flat" configuration, and the bracing linkage 170 rotated forward into contact with the spine 120.

In view of the aforesaid written description of the present invention, it will be readily understood by those persons skilled in the art that the present invention is susceptible of broad utility and application. Many embodiments and adaptations of the present invention other than those herein described, as well as many variations, modifications, and equivalent arrangements, will be apparent from or reasonably suggested by the present invention and the foregoing description thereof, without departing from the substance or scope of the present invention. Accordingly, while the present invention has been described herein in detail in relation to preferred embodiments, it is to be understood that this disclosure is only illustrative and exemplary of the present invention and is made merely for purposes of providing a full and enabling disclosure of the invention. The foregoing disclosure is not intended nor is to be construed to limit the present invention or otherwise to exclude any such other embodiments, adaptations, variations, modifications and equivalent arrangements, the present invention being limited only by the claims appended hereto and the equivalents thereof.

What is claimed is:

1. A stroller for transporting a child selectively in a standing, seated, and reclined position, comprising:
    a frame including at least two base rails interconnected by a cylindrical hub, a spine connected to the cylindrical hub by a concentric cylindrical sleeve disposed thereabout and extending therefrom, and a bracing linkage rotatably attached to the base rails and releasably disposable against the spine in supporting relation thereto;
    a plurality of wheels attached to the frame;
    a basket for supporting the child, the basket being attachable to and supported on the spine and the bracing linkage, and comprising a confinement ring for confining the child and a sling for supporting the child in the standing position; and
    a seat attached to the spine below the basket, the seat comprising a seat base member retractable for clearance in the standing position and extendable for support in the seated and reclined positions;
    wherein the frame is movable between unfolded and folded positions by rotation of the sleeve about the hub.

2. A stroller according to claim 1, further comprising:
    a handle attached to the spine.

3. A stroller according to claim 1, wherein the spine comprises a sleeve member and a handle member slidably disposed within the sleeve member to lengthen or shorten the spine.

4. A stroller according to claim 3, further comprising:
    a handle attached to the handle member, the handle being disposable at one of a series of positions corresponding to varied handle heights.

5. A stroller according to claim 1, wherein the spine is a telescoping spine for disposing a handle at a plurality of heights.

6. A stroller according to claim 1, wherein the seat further comprises a back member for supporting the child in the seated and reclined positions.

7. A stroller according to claim 6, wherein the seated position is defined by positioning the seat base member proximate to the back member and the reclined position is defined by articulating the back member away from the seat base member.

8. A stroller according to claim 1, further comprising:
    a standing support member attached to the frame and extending generally parallel to and between the base rails, for supporting feet of the child in the standing position.

9. A stroller according to claim 8, wherein the standing support member comprises a resilient support surface.

10. A stroller according to claim 9, wherein the standing support member comprises a trampoline.

11. A stroller according to claim 1, wherein the spine and the bracing linkage define therebetween a storage area.

12. A stroller according to claim 11, further comprising a hook disposed to support an article hanging within the storage area.

13. A stroller according to claim 1, wherein at least a portion of the confinement ring and the sling are co-rotatable from center.

14. A stroller according to claim 1, wherein the basket further comprises a port for receiving and retaining the bracing linkage proximate the spine.

15. A stroller according to claim 1, further comprising:
    a canopy disposable to shade the child.

16. A stroller according to claim 15, wherein the canopy comprises a plurality of individually adjustable canopy struts.

17. A stroller seat for attachment to a stroller frame, comprising:
   a basket for supporting a child and having a confinement ring for confining the child;
   a seat ring comprising upper and lower connected concentric arcs having different radii supported in upper and lower tracks on the basket, the seat ring being rotatable in the track from a center-forward position;
   a seat back supported on the lower arc, the seat back being reclinable at least when the seat ring is in the center-forward position; and
   a seat base supported on the frame and comprising a platform movable between an extended position, whereat the platform is disposed inside the seat ring, and a retracted position, whereat the platform is withdrawn from the seat ring;
   wherein the seat is selectively positionable to permit support of the child in standing, sitting, and reclining positions.

18. A stroller seat according to claim 17, further comprising at least one friction-reducing member between the seat ring and the basket.

19. A stroller seat according to claim 17, further comprising a sling for supporting the child in at least the standing position.

20. A stroller seat according to claim 17, further comprising a canopy disposable to shade the child.

21. A stroller for transporting a child selectively in a standing, seated, and reclined position, comprising:
   a frame including at least two base rails interconnected by a cylindrical hub, a spine connected to the cylindrical hub by a concentric cylindrical sleeve disposed thereabout and extending therefrom, and a bracing linkage rotatably attached to the base rails and releasably disposable against the spine in supporting relation thereto;
   a plurality of wheels attached to the frame;
   a basket for supporting the child, the basket being attachable to and supported on the spine and the bracing linkage, and having a confinement ring for confining the child;
   a seat ring comprising upper and lower connected concentric arcs having different radii supported in upper and lower tracks on the basket;
   a seat back supported on the lower arc, the seat back being reclinable at least when the seat ring is in the center-forward position; and
   a seat base supported on the frame and comprising a platform movable between an extended position, whereat the platform is disposed inside the seat ring, and a retracted position, whereat the platform is withdrawn from the seat ring.

22. A stroller according to claim 21, wherein the frame is movable between unfolded and folded positions by rotation of the sleeve about the hub.

23. A stroller according to claim 21, wherein the seat ring is rotatable in the track from a center-forward position.

24. A stroller according to claim 21, wherein the seated position is defined by positioning the seat base member proximate to the back member and the reclined position is defined by articulating the back member away from the seat base member.

25. A stroller according to claim 21, further comprising:
   a standing support member attached to the frame and extending generally parallel to and between the base rails, for supporting feet of the child in the standing position.

26. A stroller according to claim 25, wherein the standing support member comprises a resilient support surface.

27. A stroller according to claim 26, wherein the standing support member comprises a trampoline.

28. A stroller according to claim 21, wherein the spine and the bracing linkage define therebetween a storage area.

29. A stroller according to claim 28, further comprising a hook disposed to support an article hanging within the storage area.

30. A stroller according to claim 21, further comprising:
   a canopy disposable to shade the child.

31. A stroller according to claim 30, wherein the canopy comprises a plurality of individually adjustable canopy struts.

* * * * *